US006774148B2

(12) United States Patent
O'Rear (10) Patent No.: US 6,774,148 B2
(45) Date of Patent: Aug. 10, 2004

(54) PROCESS FOR CONVERSION OF LPG AND CH4 TO SYNGAS AND HIGHER VALUED PRODUCTS

(75) Inventor: Dennis J. O'Rear, Petaluma, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 14 days.

(21) Appl. No.: 10/179,604

(22) Filed: Jun. 25, 2002

(65) Prior Publication Data

US 2003/0236312 A1 Dec. 25, 2003

(51) Int. Cl.[7] ............................ C07C 27/00; C07C 1/02
(52) U.S. Cl. ...................... 518/702; 518/703; 518/705; 518/706; 518/715; 252/373
(58) Field of Search ................................ 518/702, 703, 518/705, 706, 715, 700; 252/373

(56) References Cited

U.S. PATENT DOCUMENTS

| | | | |
|---|---|---|---|
| 3,919,114 A | 11/1975 | Reynolds | |
| 4,279,830 A | 7/1981 | Haag et al. | |
| 4,690,777 A | 9/1987 | Valenyi et al. | |
| 4,703,793 A | 11/1987 | Townsend | |
| 4,782,096 A | 11/1988 | Banquy | |
| 4,785,877 A | 11/1988 | Shen-Tu | |
| 4,863,712 A | 9/1989 | Twigg et al. | |
| 5,149,516 A | 9/1992 | Han et al. | |
| 5,324,335 A | 6/1994 | Benham et al. | |
| 5,658,452 A | 8/1997 | Heyse et al. | |
| 5,674,376 A | 10/1997 | Heyse et al. | |
| 5,676,821 A | 10/1997 | Heyse et al. | |
| 5,863,418 A | 1/1999 | Heyse et al. | |
| 6,274,113 B1 | 8/2001 | Heyse et al. | |
| 6,310,108 B1 * | 10/2001 | Bonneau et al. | 518/700 |
| 6,479,557 B1 | 11/2002 | Lange et al. | |
| 2003/0148894 A1 * | 8/2003 | Vinegar et al. | 507/200 |

FOREIGN PATENT DOCUMENTS

| | | |
|---|---|---|
| BR | 8302479 | 8/1985 |
| DE | 3617280 A1 | 11/1987 |
| DE | 3941591 A1 | 6/1991 |
| WO | WO 93/15999 A1 | 8/1993 |
| WO | WO 99/55618 A1 | 11/1999 |

OTHER PUBLICATIONS

A. Santos, "Oxidation of Methane to Synthesis Gas in a Fluidized Bed Reactor Using MgO–Based Catalysts," *Journal of Catalysis*, 1996, pp. 83–91, vol. 158, Issue 1, Academic Press Inc.
S. Teuner, "A New Process to Make Oxo–Feed," *Hydrocarbon Processing*, Jul. 1987, p. 52, vol. 66, Issue 7, Gulf Pub. Co, Houston, TX.
S. Teuner, "Make CO from CO2," *Hydrocarbon Processing*, May 1985, pp. 106–107, vol. 64, Issue 5, Gulf Pub. Co, Houston, TX.
N.R. Udengaard, et al., "Sulfur Passivated Reforming Process Lowers Syngas H2/CO Ratio", *Oil & Gas Journal*, Mar. 9, 1992, pp. 62–67, vol. 90, Issue 10, Petroleum Pub Co, Tulsa, OK.
United Kingdom Search Report Dated Oct. 30, 2003.
International Search Report Mailed Nov. 28, 2003.

* cited by examiner

*Primary Examiner*—J. Parsa
(74) *Attorney, Agent, or Firm*—Burns, Doane, Swecker & Mathis, L.L.P.

(57) ABSTRACT

The present invention relates to a process for the production of a blended syngas feed with a variable $H_2/CO$ ratio for use in a syngas conversion reactor. In this process a $H_2/CO$ ratio of from approximately 1.0 to 3.0 for the blended syngas feed is selected. A first syngas is formed with a $H_2/CO$ ratio of at least 2.0 by reacting methane with an oxygen source. A second syngas is formed with a $H_2/CO$ ratio of no more than 1.5 by reacting LPG with $CO_2$. The first syngas and the second syngas are blended to form a blended syngas feed with the selected $H_2/CO$ ratio, and this blended syngas feed may be used in the syngas conversion reactor.

41 Claims, 2 Drawing Sheets

FIGURE 1

PROCESS FOR CONVERSION OF LPG AND CH4 TO SYNGAS AND HIGHER VALUED PRODUCTS

FIELD OF THE INVENTION

The present invention relates to a process for the production of a syngas feed with a variable $H_2/CO$ ratio, which may be used in syngas conversion processes.

BACKGROUND OF THE INVENTION

The conversion of natural gas assets into more valuable chemicals, including combustible liquid fuels, is desired to more effectively utilize these natural gas assets. The conversion of natural gas to more valuable chemical products generally involves syngas generation. Syngas generation involves converting natural gas, which is mostly methane, to synthesis or syngas gas, which is a mixture of carbon monoxide and hydrogen. Syngas may be used as a feedstock for producing a wide range of chemicals, including combustible liquid fuels, methanol, acetic acid, dimethyl ether, oxo alcohols, and isocyanates.

There are two main approaches to convert remote natural gas assets into conventional transportation fuels and lubricants using syngas. Natural gas may be converted into syngas followed by a Fischer-Tropsch process, or natural gas may be converted into syngas followed by methanol synthesis, which is followed by a methanol to gas process (MTG) to convert methanol into highly aromatic gasoline. The syngas generation is the most costly step of these processes. A critical feature of these processes is producing syngas with a desired $H_2/CO$ ratio to optimize formation of the desired products and to avoid problems in the syngas formation step.

Syngas can be generated from three major chemical reactions. The first involves steam reforming of methane. The ratio of hydrogen to carbon monoxide, which is formed from this process, is typically approximately 3.0. A second process for syngas generation involves dry reforming of methane or the reaction between carbon dioxide and methane. An attractive feature of this method is that carbon dioxide is converted into syngas; however, this method has problems with rapid carbon deposition. The carbon deposition or coke forming reaction is a separate reaction from the one that generates the syngas and occurs subsequent to the syngas formation reaction. However, the reaction of methane in dry reforming is slow enough that long residence times are required for high conversion rates and these long residence times lead to coke formation. The ratio of hydrogen to carbon monoxide, which is formed from this process, is typically approximately 1.0. A third process for synthesis gas generation involves partial oxidation of methane using oxygen, where the oxygen can be either air, enriched air, or oxygen with a purity in excess of 90%, preferably in excess of 99%. The ratio of hydrogen to carbon monoxide, which is formed from this process, is typically approximately 2.0. However, in commercial practice, some amount of steam is typically added to a partial oxidation reformer in order to control carbon formation and the addition of steam tends to increase the $H_2/CO$ ratio above 2.0. Likewise it is common to add relatively small amounts of $CO_2$ to the feed gas mixture in an attempt to adjust the ratio closer to 2.0.

Unless otherwise stated, syngas ratios (and percentage compositions) as described herein are in terms of molar ratios (and molar percentages).

It is possible to produce syngas with a $H_2/CO$ ratio that is above the ratio ideally desired for the process in which the syngas is to be used, and then to remove excess hydrogen to adjust the ratio to the desired value. However, the $H_2$ removal process employs expensive $H_2$ separation systems that tend to foul and decline in performance with use.

Through the use of a Caloric Calcor process, it is also known to produce high purity carbon monoxide or an oxo-feedstock of hydrogen and carbon monoxide in a ratio of between 0.5 and 1 using a LPG feedstock and carbon dioxide, as described in "Make CO from $CO_2$," *Hydrocarbon Processing*, Vol. 64, May 1985, pp. 106–107 and "A new process to make Oxo-feed," Hydrocarbon Processing, Vol. 66, July 1987, pg. 52.

The conversion of natural gas to combustible liquid fuels may also involve the production of LPG. A syngas processing facility, such as, for example, a hydrocarbon synthesis facility, typically produces LPG as well as the desired products. The export of LPG from such a facility or from the parent natural gas field is often difficult and expensive. LPG must be compressed and liquefied, and the shipment requires the use of special ocean-going vessels. Furthermore, the market for mixtures of propane and butane is small and of low value. Thus, the LPG must be separated into individual propane and butane of purity to meet specifications for sale. This complicated and expensive operation often results in high costs, which make the value of the LPG at the site of production small.

The conversion of natural gas to combustible liquid fuels further involves the production of some amount greenhouse gas emissions, such as $CO_2$. The production of significant amount of $CO_2$ is environmentally undesirable.

Accordingly, there is a need for a process for producing a syngas with a pre-selected $H_2/CO$ ratio that can be varied according to the process in which the syngas is to be employed and that avoids $H_2$ separation and coking in the syngas formation step. There is also a need for a process that minimizes or eliminates production of LPG from a processing facility, such as, for example, a hydrocarbon synthesis facility. Furthermore, there is a need to reduce the greenhouse emissions from a processing facility, such as, for example, a hydrocarbon synthesis facility.

SUMMARY OF THE INVENTION

Methods for forming syngas with a variable $H_2/CO$ ratio are disclosed. One aspect of the present invention is a process for the production of a blended syngas feed with a desired $H_2/CO$ ratio. This process comprises selecting a desired $H_2/CO$ ratio of the blended syngas feed. The desired syngas ratio may be in the range of from approximately 1.0 to 3.0. The $H_2/CO$ ratio is selected on the basis of the process in which the syngas is to be used. In this process a first syngas is formed with a $H_2/CO$ ratio of at least 2.0 by reacting methane with oxygen and water and a second syngas is formed with a $H_2/CO$ ratio of no more than 1.5 by reacting LPG (liquified petroleum gas) with $CO_2$. The first syngas and the second syngas are blended to form the blended syngas feed with the desired $H_2/CO$ ratio. The blended syngas may be fed to a syngas conversion reactor, and this reactor may be used in a gas to liquid (GTL) conversion process. The blended syngas feed may preferably be a feed for a Fischer-Tropsch reactor, and therefore, the blended syngas may be fed to a Fischer-Tropsch reactor.

An additional aspect of the present invention is a process of using LPG and $CO_2$ in preparing a syngas feed for a Fischer-Tropsch reactor. $CO_2$ and LPG are contacted at reforming reaction conditions to form a first syngas with a $H_2/CO$ ratio of not more than 1.5. The first syngas is blended with a second syngas with a $H_2/CO$ ratio of no less than 2.0 to form a blended syngas feed. The blended syngas feed is fed into the Fischer-Tropsch reactor.

A further aspect of the present invention is an integrated process for producing a blended syngas with a variable $H_2/CO$ ratio for a Fischer-Tropsch reactor. In this process a desired $H_2/CO$ ratio of a blended syngas feed to a Fischer-Tropsch reactor is selected. This process comprises reacting methane, oxygen, and steam to form a first syngas with a $H_2/CO$ ratio of at least 2.0. A second syngas is formed with a $H_2/CO$ ratio of no more than 1.5 by reacting LPG and $CO_2$. The first syngas and the second syngas are blended to form a blended syngas feed for the Fischer-Tropsch reactor having the desired $H_2/CO$ ratio. A Fischer-Tropsch synthesis process is performed using the blended syngas feed. Unreacted syngas containing $CO_2$, $H_2$, CO, and $CH_4$ is recovered from the Fischer-Tropsch reactor, and LPG is also recovered from the Fischer-Tropsch reactor.

An additional aspect of the present invention is a process for the production of a blended syngas feed with a variable $H_2/CO$ ratio. In this process a first syngas comprising $H_2$ and CO and having a $H_2/CO$ ratio in the range of from approximately 1.4 to 1.75 is fed into a first Fischer-Tropsch synthesis reactor and at least one effluent is recovered therefrom. A second syngas comprising $H_2$ and CO is recovered from the effluent wherein the second syngas has a lower $H_2/CO$ ratio than that of the first syngas. A third syngas with a $H_2/CO$ ratio of at least 2.0 s formed by reacting methane with an oxygen source. The second syngas is blended with the third syngas to form a blended syngas feed having a $H_2/CO$ ratio in the range of 1.4 to 1.75. The blended syngas feed is fed into a second Fischer-Tropsch reactor.

In a further aspect the present invention is directed to a process for the production of a blended syngas feed with a variable $H_2/CO$ ratio. In this process a first syngas comprising $H_2$ and CO and having a $H_2$ and CO ratio in the range of 1.25 to 2.1 is fed into a first Fischer-Tropsch synthesis reactor and at least one effluent is recovered therefrom. A second syngas is recovered from the effluent wherein the second syngas has a higher $H_2/CO$ ratio than that of the first syngas. A third syngas with a $H_2/CO$ ratio of no more than 1.5 is formed by reacting LPG with $CO_2$. The second syngas is blended with the third syngas to form a blended syngas feed having a $H_2/CO$ ratio in the range of 1.4 to 1.75. The blended syngas feed is fed into a second Fischer-Tropsch reactor.

In an additional aspect, the present invention is directed to a process for producing fuel comprising reacting LPG and $CO_2$ to form a first syngas with a $H_2/CO$ ratio of no more than 1.5. The syngas is reacted in a Fischer-Tropsch process to produce a hydrocarbonaceous effluent and at least a portion of the hydrocarbonaceous effluent is converted into at least one fuel.

In a separate embodiment, the present invention is directed to a process for converting gaseous and/or liquid hydrocarbons into $C_{5+}$ hydrocarbons, wherein the process has a carbon efficiency of greater than 75%. The process may comprise reforming to convert gaseous and/or liquid hydrocarbons into a syngas, hydrocarbon synthesis to convert the syngas to a hydrocarbonaceous product, separating the hydrocarbonaceous product to recover $CO_2$ and $C_{5+}$ hydrocarbons, and converting at least a portion of the $CO_2$ into $C_{5+}$ hydrocarbons. In this process a desired $H_2/CO$ ratio of a blended syngas feed to a Fischer-Tropsch reactor is selected. This process comprises reacting methane, oxygen, and steam to form a first syngas with a $H_2/CO$ ratio of at least 2.0. A second syngas is formed with a $H_2/CO$ ratio of no more than 1.5 by reacting LPG and $CO_2$. The first syngas and the second syngas are blended to form a blended syngas feed for the Fischer-Tropsch reactor having the desired $H_2/CO$ ratio. A Fischer-Tropsch synthesis process is performed using the blended syngas feed. Unreacted syngas containing $CO_2$, $H_2$, CO, and $CH_4$ is recovered from the Fischer-Tropsch reactor, and LPG is also recovered from the Fischer-Tropsch reactor.

DETAILED DESCRIPTION OF ILLUSTRATIVE EMBODIMENTS

The present invention relates to methods for forming syngas with a desired $H_2/CO$ ratio, which may be selected according to the process in which the syngas is to be used. However, prior to describing this invention in further detail, the following terms will first be defined.

Definitions

The following terms will be used throughout the specification and will have the following meanings unless otherwise indicated.

The term "integrated process" means a process comprising a sequence of steps, some of which may be parallel to other steps in the process, but which are interrelated or in some way dependent upon either earlier or later steps in the total process. Thus, a hydrocarbonaceous feed to a step in an integrated process comprises a product from a preceding step in the process; alternatively, a product of a step in an integrated process is a feed, either alone or as a blend with other feeds, for one or more subsequent steps in an integrated process.

The term "syngas" means a mixture that includes hydrogen and carbon monoxide. In addition to these species, others may also be present, including, for example, water, carbon dioxide, unconverted light hydrocarbon feedstock, and various impurities. A typical syngas contains at least 5 mol % of each CO and $H_2$.

For the purposes of this invention, the term "LPG" (liquefied petroleum gas) refers to a mixture of light hydrocarbons comprising propane and/or butane. As used herein, the term refers to a blend of hydrocarbons. Unless otherwise stated, LPG may be in either a gaseous or liquid state. The term does not necessarily refer to a liquid phase blend comprising hydrocarbons.

The term "syngas conversion reactor" means a reactor for converting syngas gas into more valuable conventional transportation fuels and lubricants. A syngas conversion reactor may also be known as a Gas to Liquid (GTL) reactor. Syngas conversion reactors include, for example, Fischer-Tropsch reactors and methanol synthesis reactors.

The present invention relates to methods for forming syngas with a desired $H_2/CO$ ratio. The desired $H_2/CO$ ratio may be selected according to the process in which the syngas is to be used. The stoichiometry of syngas conversion processes varies, and thus, the desired ratio of $H_2/CO$ of syngas to be used in the syngas conversion process varies accordingly. In addition, depending on the conditions and catalysts used in the syngas conversion process, the $H_2/CO$ ratio of the syngas needed for that process under those conditions also may vary. For a syngas conversion process, it may be important to control the $H_2/CO$ ratio of the syngas to a relatively narrow range around the ideal ratio. According to the present invention, a syngas may be formed with a $H_2/CO$ ratio set for the process in which it is to be used.

According to the present invention, a $H_2/CO$ ratio may be selected in the range of 1.0 to 3.0 on the basis of the process in which the syngas is to be used, and a syngas may be formed with the selected $H_2/CO$ ratio. Generally, the $H_2/CO$ ratio of the blended syngas feed is in the range of 1.0 to 3.0, preferably in range of 1.25 to 2.1, and more preferably in the range of 1.4 to 1.75. In the present invention, a blended syngas feed is utilized to form the syngas with the selected $H_2/CO$ ratio. It has been discovered that a syngas feed from a methane conversion and a syngas feed from a LPG conversion may be blended to form a blended syngas feed with a selected $H_2/CO$ ratio.

It has been discovered that using a syngas feed produced from LPG and carbon dioxide, which is recovered from a syngas conversion process, such as a Fischer-Tropsch process, reduces unwanted carbon dioxide emissions of the conversion process. In addition, blending syngas streams to generate a blended syngas with the desired $H_2/CO$ ratio is much simpler than the current alternative processes of removing excess $H_2$ from a $H_2$-rich syngas to form a syngas with a desired $H_2/CO$ ratio.

Blended Syngas Feed

According to the present invention, one syngas feed may be generated using a methane conversion. Methane may be used to produce a syngas with a $H_2/CO$ ratio of at least 2.0. Catalysts and conditions for converting methane into syngas are well known to those of skill in the art. Commercial processes for converting methane to syngas include partial oxidation, catalytic partial oxidation, steam reforming, autothermal reforming, series reforming, convective reforming, gas heated reforming, and the like.

These reforming processes are well known in the art. The reforming processes all produce syngas from methane and an oxidant (steam, oxygen, carbon dioxide, air, enriched air or combinations thereof). The effluent from the reforming processes typically contains some carbon dioxide and steam in addition to CO and $H_2$. Series reforming, convective reforming and autothermal reforming incorporate more than one syngas forming reaction in order to better utilize the heat of reaction. The processes for producing synthesis gas or syngas from $C_1$–$C_3$ alkanes are well known in the art. Steam reformation is typically effected by contacting $C_1$–$C_3$ alkanes with steam, preferably in the presence of a reforming catalyst, at a temperature in the range of about 1300° F. (705° C.) to about 1675° F. (913° C.) and pressures from about 10 psi (0.7 bars) to about 500 psia (34 bars).

The reforming can be operated in two stages with the first called a pre-reformer. A pre-reformer is often used when the gas feed contains hydrocarbons other than methane (e.g., $C_{2+}$ hydrocarbons). Without a pre-reformer, the $C_{2+}$ hydrocarbons can cause operational problems due to coking and metal dusting. As the hydrocarbons in the feed to the reforming section become heavier, the need for a pre-reformer become greater. Suitable reforming catalysts which can be used include, for example, nickel, palladium, nickel-palladium alloys, and the like. Additional information regarding steam reforming $C_1$–$C_3$ alkanes, e.g., methane, to syngas can be found in U.S. Pat. No. 5,324,335 hereby incorporated by reference in its entirety.

The partial oxidation of $C_1$–$C_3$ alkanes to syngas is also conducted at high temperature and while the partial oxidation may be conducted without a catalyst it is more effectively conducted in the presence of a catalyst. In general Group VIII metals can be used as the catalyst typically supported on a mineral oxide or synthetic support, e.g., alumina. Typically, the partial oxidation is conducted at temperatures in about the range of 1500° F. (815° C.) to about 2000° F. (1093° C.) and pressures in about the range from atmospheric to 3000 psia (1 to 20.4 bars). Space velocities can vary over a very wide range and typical range from 100 to 100,000 $hr^{-1}$ and even higher depending on the particular catalyst used and the type of reactor. A discussion of nickel silica alumina and nickel/magnesium oxide and cobalt/magnesium oxide and other oxidation catalysts may be found in A. Santos et al., "Oxidation of Methane to Synthesis Gas in Fluidized Bed Reactor using MgO-Based Catalysts", *Journal of Catalysis*, Vol. 158 (1996) pp. 81–91 hereby incorporated by reference in its entirety. The partial oxidation may also be conducted using a perovskite catalyst partial oxidation process such as described in U.S. Pat. No. 5,149,516 hereby incorporated by reference in its entirety. Perovskites are materials having essentially the same crystal structure as the mineral perovskite (Ca Ti $O_3$) without limitation as to the elemental constituents thereof. Such materials can be represented by the formula $XYO_3$ wherein X and Y can be variety of elements. For example, X can be La, Ca, Sr, Ba, Na, K, Ag, Cd and mixtures thereof and Y can be Ta, Co, Ti, Ga, Nb, Fe, Ni, Mn, Gr, V, Th, Pb, Sn, Mo, Zn and mixtures thereof. Partial oxidation reactions using a perovskite catalyst are typically conducted at temperatures in the range of about from 600 to 900° C., pressures of about from 0.1 to 100 bar and gas hourly space velocities of from 100 to 300,000 $hr^{-1}$. These space velocities are determined using a gas volume based on NTP conditions (25° C. and one atmosphere of pressure). The mol ratio of lower alkane can vary from 1:1 to 100:1 moles of alkane to oxygen.

If the amount of $C_1$–$C_3$ alkanes exceeds the capacity of the synthesis gas unit, the surplus $C_1$–$C_3$ alkanes can be used to provide energy throughout the facility. For example, excess $C_1$–$C_3$ alkanes may be burned in a steam boiler to provide the steam used in the thermal cracking step of the present process.

Autothermal reforming of methane is a preferred process for converting methane to syngas. In autothermal reforming methane is reacted with water, oxygen and optionally $CO_2$ to produce a syngas with a $H_2/CO$ ratio of greater than 1.5, preferably a $H_2/CO$ ratio in the range of 2.0 to 2.5. Autothermal reforming combines features of both partial oxidation of methane and steam reforming of methane in a single reactor. In this process, methane is partially oxidized in a specially-designed burner and the resulting hot gas passes through a catalyst bed where steam reforming occurs. Autothermal reforming is typically conducted at temperatures of about 600 to 900° C., pressures of about from 0.1 to 100 bar and gas hourly space velocities of from 100 to 300,000 $hr^{-1}$. A catalyst containing a Group VIII metal is preferably used. By way of example, nickel-containing catalysts may be used for autothermal reforming. Conditions for autothermal reforming of methane are well known to those of skill in the art.

A second syngas feed may be generated using a LPG conversion. Accordingly, LPG is used to produce a syngas with a $H_2/CO$ ratio less than 2.0, preferably a $H_2/CO$ ratio of no more than 1.5, more preferably of no more than 1.0, and still more preferably in the range of 0.5 to 1.0. If used alone, a syngas feed from a LPG conversion may have a $H_2/CO$ ratio that is less than desired. Catalysts and conditions for converting LPG into a feed mixture of hydrogen and carbon monoxide are well known to those of skill in the art. Commercial processes for converting LPG to a feed of hydrogen and carbon monoxide include dry reforming processes, such as the Calcor process.

In particular, the Calcor processes may be used to convert LPG into a feed of hydrogen and carbon monoxide, as described in, for example, "Make CO from $CO_2$," *Hydrocarbon Processing*, Vol. 64, May 1985, pp. 106–107 and "A new process to make Oxo-feed," *Hydrocarbon Processing*, Vol. 66, July 1987, pg. 52. In the Calcor process, LPG is reacted with carbon dioxide to produce a hydrogen and carbon monoxide product with a $H_2/CO$ ratio of 0.5 to 1.0. Typically, hydrogen would be removed and pure carbon monoxide would be isolated from the hydrogen/carbon monoxide product of the Calcor processes. It has been discovered that the hydrogen/carbon monoxide product may be used as a syngas feed for a Fischer-Tropsch reactor without isolation of hydrogen, which is often a feature of the conventional Calcor process.

The process and conditions used for dry reforming of LPG are similar to those used in dry reforming of methane and are well known to those of skill in the art. A catalyst containing a Group VIII metal may be used. In addition to the Group VIII metal catalysts, inert metal oxides, such as silica or alumina may be used as supports. Other metals, such as manganese or chromium may be used or used with a Group VIII metal as a promoter. To reduce coking, the acidity of the support should be reduced by using non-acidic aluminas, silicas, or by neutralization with Group I or II metals.

Before dry reforming, it is desirable to remove any sulfur compounds (e.g., hydrogen sulfide and mercaptans) contained in the LPG. Conditions and methods for removing sulfur/sulfur compounds from LPG are well known to those of skill in the art. By way of example, the sulfur compounds may be removed by passing LPG through a packed bed sulfur scrubber containing a zinc oxide bed or other slightly basic packing material. Sulfur compounds may also be removed by contacting the LPG with a caustic solution as used in Merox, Minalk, and related processes, the conditions of which are also well known to those of skill in the art.

Conditions for performing dry reforming of LPG are described in, for example, "Make CO from $CO_2$," *Hydrocarbon Processing*, Vol. 64, May 1985, pp. 106–107. These conditions are well known to those of skill in the art. The preferred temperature is in the range of about 1300° F. (705° C.) to about 1675° F. (913° C.) and the preferred pressures are in the range of from about 10 psia (0.7 bars) to about 500 psia (34 bars). Preferably the pressure of the LPG conversion reactor is close (within 50 psi) to the pressure of the syngas conversion reactor, thus eliminating or at least reducing the need for compression. Contact time should be sufficient to convert at least 25% of the combined hydrocarbons boiling higher than propane in the feed, preferably at least 50%, more preferably at least 75%, and most preferably at least 90%.

After the dry reforming reactor, the effluent should be quenched as quickly as possible to avoid carbon/coke formation. This quenching can be done by heat exchange or by injection of a quenching material. These quenching materials include, for example, a cool hydrocarbon stream or water. Methods to control coking include devices to rapidly quench the syngas and to passivate the metal surfaces to avoid carbon formation. References for passivation include: U.S. Pat. No. 6,274,113, U.S. Pat. No. 5,863,418, U.S. Pat. No. 5,676,821, U.S. Pat. No. 5,674,376, and U.S. Pat. No. 5,658,452. Sulfur may be used to inhibit coking. The problems associated with coking during the production of low $H_2/CO$ syngas and the use of sulfur to inhibit this coking are described in "Sulfur passivated reforming process lowers syngas $H_2/CO$ ratio" by N. R. Udengaard et al., *Oil and Gas Journal*, Mar. 9, 1992, pages 62–67. However, when the syngas is to be used for a sulfur-sensitive Fischer-Tropsch process, passivating the metal surfaces with sulfur is undesirable. References for devices to rapidly quench and avoid coking include: U.S. Pat. No. 4,703,793 and U.S. Pat. No. 4,785,877. A venturi device can be used to rapidly quench the exit gas stream, and the feed to the venturi device consists of the outlet from the reformer and a cooled recycle gas stream. This device is shown in DE3941591A1.

The stoichiometric reactions for conversion of propane and butane by the Calcor dry reforming reactions are as follows:

$$C_4H_{10} + 4CO_2 \rightarrow 8CO + 5H_2$$

$$C_3H_8 + 3CO_2 \rightarrow 6CO + 4H_2$$

Thus, the stoichiometric ratio of $CO_2$ to LPG in the feed varies between 3 and 4 depending on the proportion of butane and propane in the feed. In actual practice, the stoichiometric amount of $CO_2$ needed can be calculated from the average feed composition. The molar ratio of $H_2/CO$ in the product varies from 0.67 for propane to 0.62 for butane. Again, the molar ratio of $H_2/CO$ in the product varies from 0.5 to 1.0 depending on the composition of the feed, and typically varies from 0.55 to 0.7. These ratios refer to the $H_2$ and CO produced in the reaction of hydrocarbons with $CO_2$ in the absence of other reactive species. If $H_2$, $H_2O$, $O_2$ or CO are also in the feed to the Calcor process, the resulting ratios of $H_2/CO$ can be different, but are usually still within the desired range of less than 2.0, typically less than 1.5.

The molar ratio of initial feed of $CO_2$ to LPG should be between 0.5 and 1.5 of the stoichiometric amount needed to convert the product by the dry reforming reaction, preferably between 0.75 and 1.25 and most preferably between 0.9 and 1.1. Typically an excess of $CO_2$ is added to assist in complete conversion of the LPG. In addition to $CO_2$, the feed to the unit may also include some water and oxygen, as these will tend to increase the $H_2/CO$ ratio. Furthermore, the feed may contain some $H_2$ and CO in addition to $CO_2$, since some Fischer-Tropsch product streams that are rich in $CO_2$ also contain some residual $H_2$ and CO.

Optionally, the effluent from the LPG conversion reactor can be further purified to remove impurities such as water, carbon dioxide, and traces of sulfur, nitrogen and acetylenic compounds. The purification can be done by contacting the effluent (i.e., the syngas product) with an adsorbent, such as water, or by contact with a solid adsorbent, such as a basic material capable of removing acidic compounds like $CO_2$ and acetylenic compounds. This purification of the syngas can be done on the syngas product from the LPG conversion reactor, or blends of the syngas product from the LPG conversion reactor with other syngas streams, such as a syngas product from a methane conversion reactor or a recycle syngas from the Fischer-Tropsch reactor.

A key technical feature of the present invention is the recognition that the reaction of LPG with $CO_2$ or water is much faster than the corresponding reaction with methane. The faster reaction permits the LPG to be converted at a high conversion rate to a syngas with a relative low $H_2/CO$ ratio by use of a reactor with a short residence time. By rapidly quenching the product of the LPG conversion, subsequent coke formation can be minimized or avoided all together. In comparison, methane is much less reactive with $CO_2$ than LPG, and high methane conversions are difficult if not impossible to achieve. Achieving them requires long residence times at high temperatures, which increase the likelihood of coking. Also, while unconverted methane is difficult to separate from syngas (and thus may build up in a syngas recycle loop), LPG can be separated from syngas. Accordingly, it is not essential to obtain a high conversion of LPG in a LPG to syngas conversion process. Therefore, LPG can be converted into a syngas with a $H_2/CO$ ratio less than 2.0, preferably 1.5 or less, and most preferably 1.0 or less, while avoiding coke formation.

LPG used in the LPG conversion process can originate from a variety of sources. By way of example, the LPG can be isolated from a natural gas asset; it can be co-produced with methane from a hydrocarbon reservoir as a "wet gas or broad fraction"; it can be a recovered as a condensate during crude production; it can be recovered from a syngas conversion process (i.e., a Fischer-Tropsch process); and it can be recovered as a product derived during upgrading of syngas conversion products, in particular a Fischer-Tropsch conversion process. Due to increased efficiencies, preferably at least a portion of the LPG used in the LPG conversion process is recovered as a product of the syngas conversion process. Therefore, the syngas may be used in a syngas conversion process, for example, a Fischer-Tropsch process, and this process may produce a starting material used to generate the syngas.

Typically, LPG from the above-listed sources would be collected, shipped and sold; however, LPG has a lower value than higher boiling hydrocarbons. In addition, LPG is difficult to export and potentially dangerous, and thus expensive to ship and store. In the present invention, LPG is advantageously used to produce more valuable higher boiling hydrocarbon products, thereby minimizing or avoiding the costly and hazardous facilities associated with storage and transport of LPG.

Carbon dioxide used in the LPG conversion process can originate from a variety of sources. By way of example, the carbon dioxide may be recovered or extracted from a syngas stream product from a methane conversion process, from a syngas stream from a LPG reforming process, from a blended syngas stream, from unreacted syngas from the syngas conversion process (i.e., a Fischer-Tropsch process), from a portion of unreacted syngas that is recycled to the syngas conversion process, from a portion of syngas that is used as fuel or for other purposes, or from a blend of a fresh syngas stream and a recycled, unconverted syngas stream. Carbon dioxide may also be obtained from other sources including, for example, an effluent of a Fischer-Tropsch reactor, a syngas stream from a methane conversion process, a natural gas asset, a furnace flue gas, and combinations thereof. The furnace flue gas may originate, for example, from furnaces used in a syngas conversion process (i.e., a Fischer-Tropsch process), from furnaces used in gas production equipment or a crude production process. Due to increased efficiencies, preferably at least a portion of the carbon dioxide used in the LPG conversion process is recovered from a syngas conversion reactor (i.e., a Fischer-Tropsch reactor). Therefore, the syngas may be used in a syngas conversion process, for example, a Fischer-Tropsch process, and this process may produce a starting material used to generate the syngas.

Figure 1:
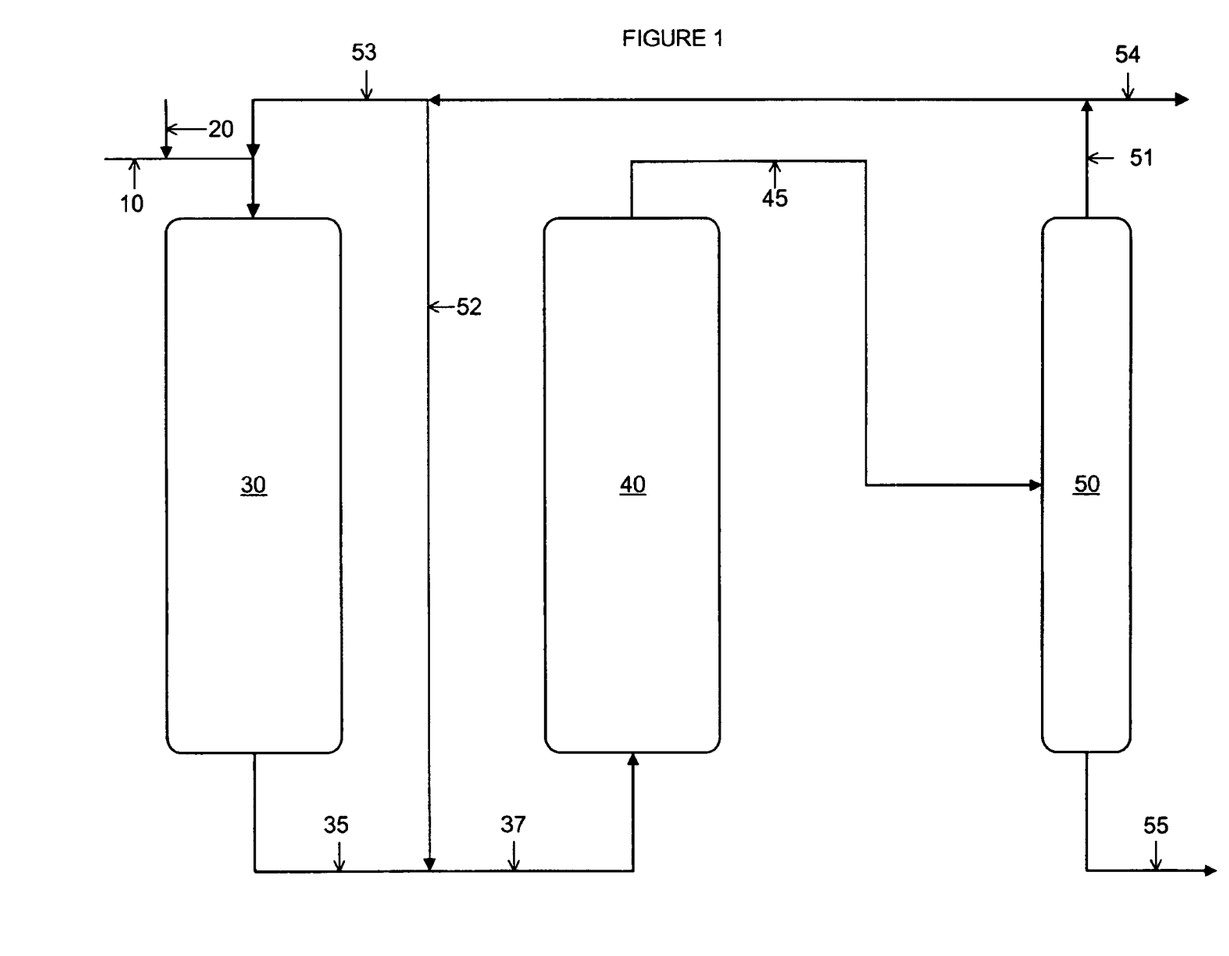
FIG. 1 illustrates a block diagram of a conventional Fischer-Tropsch synthesis process in which a single syngas stream is formed by reacting methane with oxygen and steam and this stream is fed into a Fischer-Tropsch reactor.

In the conventional Fischer-Tropsch process using non-shifting catalysts, as shown in FIG. 1, a methane-containing stream 10, with an added oxygen-containing stream 20, optionally which contains water, is converted to syngas 35 in syngas formation unit 30 (e.g. autothermal reformer). A blended syngas feed 37 is passed to a Fischer-Tropsch synthesis reactor 40. Products 45 from the Fischer-Tropsch synthesis reactor are passed to separator 50 for recovering hydrocarbon liquids 55, including $C_{5+}$ hydrocarbon liquids. Light gas 51 is also recovered from separator 50. This light gas 51, which may contain one or more of LPG, $H_2$, CO and $CO_2$, may be recycled to the Fischer-Tropsch synthesis reactor through conduit 52, or to the syngas formation unit through conduit 53, or may be recovered as fuel gas 54.

$CO_2$ is produced in small amounts in the syngas formation unit 30 and Fischer-Tropsch hydrocarbon synthesis reactor (s) 40. However, it builds up to high levels, typically about 30% in the recycle gas streams. It is an inert in the Fischer-Tropsch reactor and as its concentration rises, the concentration of reactive $H_2$ and CO drops, thus decreasing the efficiency of the process. A portion of the recycle gas stream 52 must be purged 54 (and used as a low-energy content fuel) to control the $CO_2$ buildup. Use of the $CO_2$ in this gas stream (either as separated $CO_2$ or as at least a portion of the gas stream without separation of the $CO_2$) enables the $CO_2$ to be converted into valuable products, Fischer-Tropsch reactor efficiency to be improved, and $CO_2$ emissions to be reduced.

It has been discovered that using a syngas produced from LPG and carbon dioxide, which is recovered from a syngas conversion process (i.e., a Fischer-Tropsch process), reduces the unwanted carbon dioxide emissions of the conversion process.

It has been discovered that the syngas stream from the methane conversion and the syngas stream from the LPG conversion advantageously may be blended to form a blended syngas feed. A desired $H_2/CO$ ratio may be selected for this syngas feed based on the conditions of the syngas conversion to be performed. The syngas streams may be blended in such a way as to achieve the desired $H_2/CO$ ratio. The blended syngas with the desired $H_2/CO$ ratio may be fed to a reactor, which ideally requires a syngas feedstock with the desired $H_2/CO$ ratio. The blended syngas feed may preferably be a feed to a Fischer-Tropsch reactor. An unreacted, recycle syngas stream from the reactor may also be blended into the blended syngas stream and this further blended syngas stream may be fed into the reactor.

Methods for blending the syngas streams and controlling the quantity of individual syngas streams added to form the blended syngas stream would be readily understood and devised by one of skill in the art. The syngas streams, which are blended to form a blended syngas, originate from a LPG conversion and a methane conversion and, optionally, an unreacted, recycle syngas stream. As one of skill in the art would readily understand and be able to devise, these streams may be blended in a variety of ways to achieve the desired $H_2/CO$ ratio. The streams may be blended in a blending zone and one blended syngas is provided from the blending zone.

Blending of the syngas streams to generate a blended syngas with the desired $H_2/CO$ ratio is much simpler than the current alternative processes of removing excess $H_2$ from a $H_2$-rich syngas. The blending may be accomplished by conventional process control schemes. By way of example, to blend the syngas products, the syngas streams may be pumped together in specified amounts to achieve the selected $H_2/CO$ ratio and then pumped into a syngas conversion reactor, preferably a Fischer-Tropsch reactor. In general, it is desirable to control the composition of the final blended syngas that is fed to the syngas conversion reactor. As one of skill in the art would readily understand and be able to devise, controlling the blending of the syngas streams may be accomplished in a variety of ways. There are several process alternatives to control this blending operation, but in general, one stream is produced in slight excess and during normal operation the excess can be used as fuel, recycled to a syngas conversion process, flared, or used in a separate syngas conversion process. The relative feed rates to the methane and LPG converters can also be controlled to generate the desired composition. Also, combinations of control methods can be used to make both rapid and slower long-term adjustments.

Also as one of skill in the art would readily understand and be able to devise, the $H_2/CO$ ratio may be monitored in a variety of ways. By way of example, the $H_2/CO$ ratio may be monitored in the individual syngas streams and/or in the blended syngas by gas chromatography, mass spectrometry, gas density, Orsat chemical analysis, and the like. In the alternative, the $H_2/CO$ ratio may be approximated based on the conversion conditions, and a quantity of the syngas streams may be blended to achieve the selected $H_2/CO$ ratio using the approximate ratios. By way of example, if a higher $H_2/CO$ ratio was selected, a larger quantity of syngas stream from the methane conversion may be blended, and in the alternative, if a lower $H_2/CO$ ratio was selected, a larger quantity of syngas stream from the LPG conversion may be blended. Methods for controlling and monitoring the quantity of individual syngas streams added to form the syngas blend would also be readily understood and devised by one of skill in the art.

Although this process requires construction of two separate syngas generators, there is no loss of economic efficiency because there is a limit to the scale on which syngas generators can be built. This limit in scale demands that for large syngas conversion facilities, which typically produce >30,000 BPD (barrels per day) of product, such as Fischer-Tropsch facilities, more than one syngas generator will likely be needed anyway.

Gas to Liquid Conversion Processes

Remote natural gas assets may be converted into conventional transportation fuels and lubricants by two main processes. Both processes use syngas as an intermediate, and depending on the catalysts and conditions, each process has an ideal $H_2/CO$ ratio for the syngas. These syngas conversion processes include Fischer-Tropsch processes and methanol synthesis coupled with the methanol to gasoline (MTG) processes.

According to the present invention, a preferred conversion process is a Fischer-Tropsch process. The Fischer-Tropsch products include, for example, gasoline, naphtha, diesel fuel, jet fuel, lube base stocks, and the like. Fischer-Tropsch processes utilize natural gas (which is mostly methane) that has been converted to synthesis gas, or syngas, which is a mixture of carbon monoxide and hydrogen.

The syngas generation is the most costly step of the Fischer-Tropsch synthesis process. It has been discovered that a critical feature of the Fischer-Tropsch process is producing syngas with a desired $H_2/CO$ ratio to optimize formation of the desired Fischer-Tropsch products and avoid problems in the syngas formation step.

Fischer-Tropsch products possess many desirable properties. By way of example, Fischer-Tropsch products are highly paraffinic and have very low levels of sulfur, nitrogen, aromatics, and cycloparaffins. Fischer-Tropsch products also have excellent combustion and lubricating properties. However, a disadvantage of a typical Fischer-Tropsch process is that relatively large amounts of $CO_2$ are emitted during the conversion of natural gas into Fischer-Tropsch products.

Catalysts and conditions for performing Fischer-Tropsch synthesis are well known to those of skill in the art, and are described, for example, in EP 0 921 184 A1, the contents of which are hereby incorporated by reference in their entirety.

In the Fischer-Tropsch process, liquid and gaseous hydrocarbons are formed by contacting a synthesis gas, comprising a mixture of $H_2$ and CO, with a Fischer-Tropsch catalyst under suitable temperature and pressure reactive conditions. Reaction conditions for the Fischer-Tropsch reaction typically include operating at temperatures of about 300 to 700° F. (149 to 371° C.), preferably about from 400 to 550° F. (204 to 228° C.); pressures of about from 10 to 600 psia, (0.7 to 41 bars), preferably 30 to 300 psia, (2 to 21 bars) and catalyst space velocities of from about 100 to about 10,000 cc/g/hr., preferably 300 to 3,000 cc/g/hr. Examples of conditions for performing Fischer-Tropsch type reactions are well known to those of skill in the art.

The products of the Fischer-Tropsch synthesis process may range from $C_1$ to $C_{200+}$ with a majority in the $C_5$ to $C_{100+}$ range, and the products may be distributed in one or more product fractions. The reaction can be conducted in a variety of reactor types, for example, fixed bed reactors containing one or more catalyst beds, slurry reactors, fluidized bed reactors, or a combination of different type reactors. Such reaction processes and reactors are well known and documented in the literature. In the Fischer-Tropsch process, the desired Fischer-Tropsch product typically will be isolated by distillation. A particularly preferred Fischer-Tropsch process is taught in EP 0609079, herein incorporated by reference in its entirety.

In general, suitable Fischer-Tropsch catalysts comprise one or more Group VIII catalytic metals such as Fe, Ni, Co, Ru and Re. Additionally, a suitable catalyst may contain a promoter. Certain catalysts are known to provide chain growth probabilities that are relatively low to moderate, for example, iron-containing catalysts, and the reaction products include a relatively high proportion of low molecular ($C_{2-8}$) weight olefins and a relatively low proportion of high molecular weight ($C_{30+}$) waxes. Certain other catalysts (e.g. cobalt-containing catalysts) are known to provide relatively high chain growth probabilities, and the reaction products include a relatively low proportion of low molecular (i.e., $C_{2-8}$) weight olefins and a relatively high proportion of high molecular weight (i.e., $C_{30+}$) waxes. Such catalysts are well known to those of skill in the art and can be readily obtained and/or prepared. The preferred catalysts of this invention contain either Fe or Co, with Co being preferred.

The product from the Fischer-Tropsch process may be further processed using, for example, hydrocracking, hydroisomerization, and hydrotreating. Such processes crack and/or isomerize the larger synthesized molecules into fuel range and lube range molecules with more desirable boiling points, pour points, and viscosity index properties. Such processes may also saturate oxygenates and olefins to meet the particular needs of a salable products (naphtha, diesel, jet, lube base stock). These processes are well known in the art and do not require further description here.

Due to the net stoichiometry for a Fischer-Tropsch reaction, the desired $H_2/CO$ ratio of the syngas is approximately 1.5. If the syngas has a $H_2/CO$ ratio in excess of the desired value, the formation of unwanted methane in the conversion process becomes excessive. If the $H_2/CO$ ratio becomes too low, the catalyst can coke, or the formation of oxygenated species, olefins, and very heavy waxes can become excessive. Therefore, it has been discovered that it is important to control the syngas $H_2/CO$ ratio to be fed to the Fischer-Tropsch reactor to relatively narrow ranges. The values of the range depend on the catalyst used in the syngas conversion step. While the ideal ratio for conversion is 1.5, actual ratios needed in the syngas fed to the reactor may differ in practice. Typical gas compositions are as follows:

| Stream | Reference No. (FIG. 1) | $H_2/CO$ | $CO_2$, mole % |
|---|---|---|---|
| Syngas from Reformer | 35 | 1.95 | 5 |
| Syngas Blend to Fischer-Tropsch | 37 | 1.5 | 20 |
| Light Gas Recycle to Fischer-Tropsch | 52 | 1.0 | 30 |
| Light Gas Recycle To Reformer | 53 | 1.0 | 30 |
| Fuel Gas | 54 | 1.0 | 30 |

By way of example, iron Fischer-Tropsch catalysts typically may operate at lower $H_2/CO$ ratios than cobalt Fischer-Tropsch catalysts because iron catalysts may also catalyze the water shift reaction:

$$CO + H_2O \rightarrow CO_2 + H_2$$

The water for this reaction is produced by the Fischer-Tropsch reaction. If conversion for the Fischer-Tropsch reaction is high and significant amounts of water are present, significant amounts of carbon monoxide may be converted to $H_2$, increasing the $H_2/CO$ ratio and thus leading to excessive methane formation. To counter this effect, the syngas $H_2/CO$ ratio used with iron Fischer-Tropsch catalysts may be less than 1.5 and is typically close to 1.0. Fischer-Tropsch catalysts that promote the water gas shift reaction, such as iron, are known as shifting synthesis catalysts. In contrast, a cobalt Fischer-Tropsch catalyst catalyzes the water gas shift reaction to a much smaller extent and thus is referred to as non-shifting Fischer-Tropsch catalyst. Therefore, the syngas $H_2/CO$ ratio used with cobalt Fischer-Tropsch catalysts is closer to the stoichiometric required ratio of 2.0 and is typically 1.5 to 1.75. With cobalt catalysts, the ratios are kept below 2.0 in an effort to minimize methane formation and maximize the production of heavy products. Unreacted $H_2$-rich syngas is blended with $H_2$-deficient syngas made in the syngas reactor and recycled to the Fischer-Tropsch reactor as shown in FIG. 1.

Accordingly, it has been discovered that the syngas $H_2/CO$ ratio needs to be adjusted to values that depend on the characteristics of the Fischer-Tropsch catalyst being used, the desired products, and the reaction conditions. The method of the present invention for forming a blended syngas with a desired $H_2/CO$ ratio allows the syngas ratio to be readily adjusted for the syngas conversion reaction being performed.

Integrated Processes for Producing Variable $H_2/CO$ Syngas Feed

Figure 2:
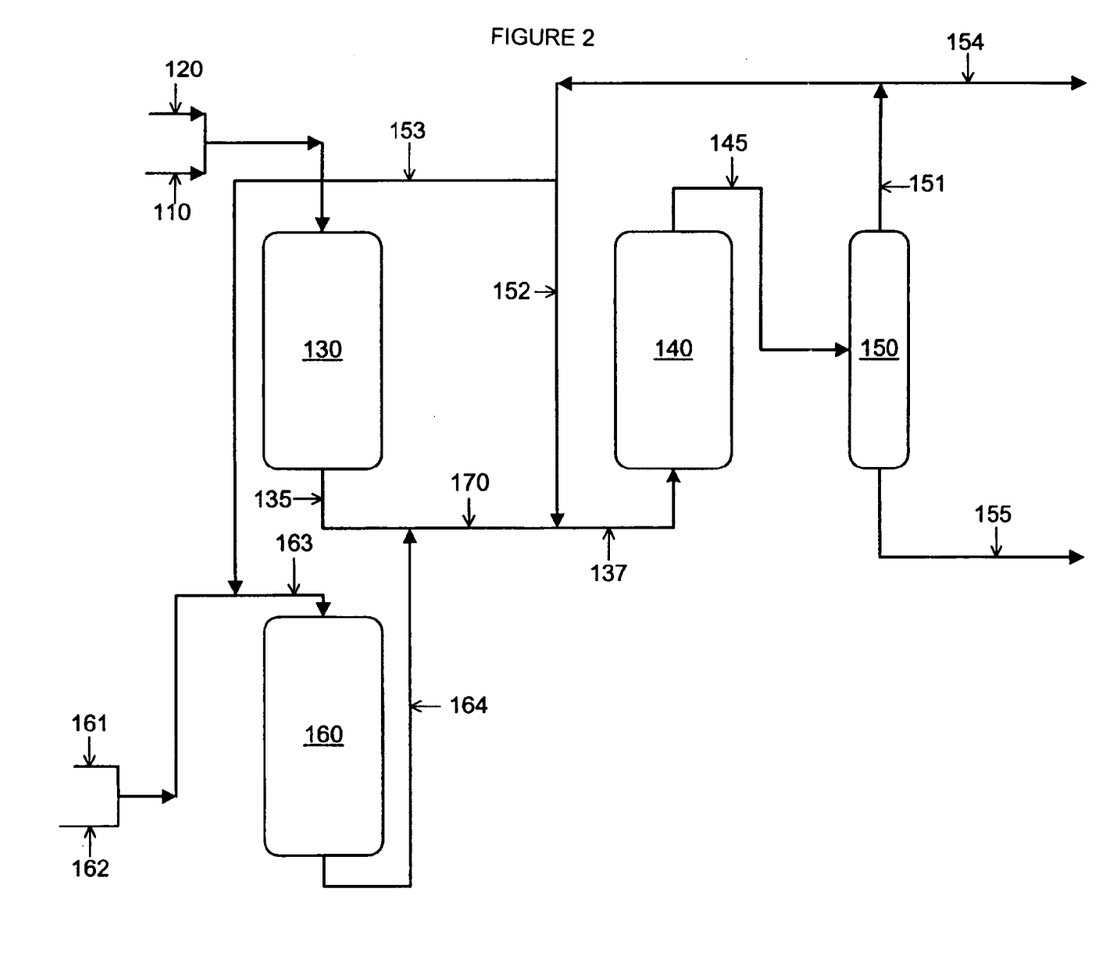
FIG. 2 illustrates a block diagram of a specific embodiment of an integrated Fischer-Tropsch process of the present invention using a blended syngas feed with a variable $H_2/CO$ ratio.

FIG. 1 illustrates an exemplary conventional Fischer-Tropsch synthesis system with typical gas compositions, as described hereinbefore. FIG. 2 illustrates an exemplary integrated Fischer-Tropsch synthesis system according to the present invention using two syngas formation steps, one of which is a methane conversion and the other is a LPG conversion. Exemplary gas compositions are as follows:

| Stream | Reference No. (FIG. 2) | $H_2/CO$ | $CO_2$, Mole % |
|---|---|---|---|
| Syngas from Reformer | 135 | 2.1 | 3 |
| Syngas Blend to Fischer-Tropsch | 137 | 1.5 | 10 |
| Light Gas Recycle to Fischer-Tropsch | 152 | 1.0 | 15 |
| Light Gas Recycle To Reformer | 153 | 1.0 | 15 |
| Fuel Gas | 154 | 1.0 | 15 |
| Syngas from LPG Converter | 164 | 0.8 | 10 |

It is important to note that the $CO_2$ in the recycle gas steams and the fuel gas have been reduced in comparison to the conventional case in FIG. 1. In the process illustrated in FIG. 2, a desired syngas $H_2/CO$ ratio of approximately 1.5 is selected for the syngas feed 137 to the Fischer-Tropsch reactor 140. To form the syngas feed for the Fischer-Tropsch GTL facility, methane 110 is mixed with oxygen and steam 120. The mixture is fed into a methane syngas generator zone 130, for example, an autothermal reformer, to generate a first syngas feed 135 with a $H_2/CO$ ratio in excess of 2.0, for example, approximately 2.1.

Also to form the syngas feed, LPG 161, $CO_2$ 162, and recycle syngas 153, containing $CO_2$, CO, $H_2$, and $CH_4$, are mixed. This mixture 163 is fed into a LPG syngas generator zone 160, for example a dry reforming reactor, to generate a second syngas feed 164 with a total $H_2/CO$ ratio less than 2.0, preferably no more than 1.5, for example 0.8. The $H_2/CO$ ratio initially produced by the reaction of $CO_2$ and LPG is approximately 0.65. This ratio is increased to 0.8 by use of the external recycle stream 153 that already contained $H_2$ and CO with a ratio of 1.0.

The first syngas feed 135, an internal recycle syngas stream 152 with a $H_2/CO$ ratio of 1.0 and the second syngas feed 164 are blended in a blending zone 170 to form a third syngas stream 137 with a $H_2/CO$ ratio of approximately 1.5. The blended syngas feed 137 is fed into a Fischer-Tropsch reactor zone 140. The effluent from the Fischer-Tropsch reactor 145, which consists of gas and liquid products and unreacted syngas, is separated, typically by distillation, in the separation zone 150 to provide unreacted, recycle syngas 151 and hydrocarbon products 155. A portion of the unreacted syngas 154 may be used as fuel. Recycle LPG may also be obtained from the Fischer-Tropsch reactor. Since the methane in the recycle syngas will not be converted to a great extent in the LPG converter due to the lower reactivity of the methane relative to LPG, optionally a portion of the recycle syngas may also be sent to the methane syngas generator zone.

In a separate embodiment of the invention, the present process is useful for maintaining the desired $H_2/CO$ ratio in each of a multiplicity of Fischer-Tropsch reactors, each operated in series with respect to the flow of syngas from each reactor to a succeeding reactor in the series. In this embodiment of the invention, a first syngas, comprising $H_2$ and CO and having a $H_2/CO$ ratio in the range of 1.25 to 2.1, preferably in the range of 1.4 to 1.75, is fed into a first Fischer-Tropsch synthesis reactor, which is maintained at Fischer-Tropsch operating conditions. The preferred Fischer-Tropsch catalyst in the first Fischer-Tropsch synthesis reactor of this embodiment comprises cobalt. The first syngas may be formed as a blend of a syngas formed by an autothermal reformer and having a $H_2/CO$ ratio in the range of 2.0 to 2.5, blended with a syngas formed by a dry reforming reaction and having a $H_2/CO$ ratio of no more than 1.0. A second syngas is recovered from the effluent from the Fischer-Tropsch synthesis reactor, wherein the second syngas has a lower $H_2/CO$ ratio than that of the first syngas. Before passing the second syngas to a second Fischer-Tropsch synthesis reactor, it is desirable to increase the $H_2/CO$ ratio in the second syngas to a desired ratio appropriate for the catalyst and conditions of the second Fischer-Tropsch synthesis reactor. According to the invention, the $H_2/CO$ ratio may be increased by adding a third gas having a higher $H_2/CO$ ratio. The process then includes forming a third syngas with a $H_2/CO$ ratio of at least 2.0 by reacting methane with an oxygen source; blending the second syngas with the third syngas to form a blended syngas feed having a $H_2/CO$ ratio in the range of 1.25 to 2.1, preferably in the range of 1.4 to 1.75; and feeding the blended syngas into a second Fischer-Tropsch reactor. Preferably, the third syngas is formed by an autothermal reformer and has a $H_2/CO$ ratio in the range of 2.0 to 2.5.

In another separate embodiment, it may be desired to conduct the Fischer-Tropsch reactions in a series of reactors, in which one or both reactors produce a syngas effluent in which the $H_2/CO$ ratio increases during the Fischer-Tropsch reaction. An example of such a Fischer-Tropsch reaction would include one conducted over a shifting (i.e., iron-containing) catalyst. In this embodiment, a first syngas, comprising $H_2$ and CO and having a $H_2/CO$ ratio in the range of 1.0 to 2.1, preferably in the range of 1.1 to 1.75, is fed into a first Fischer-Tropsch synthesis reactor, which is maintained at Fischer-Tropsch operating conditions. The first syngas may be formed as a blend of a syngas formed by an autothermal reformer and having a $H_2/CO$ ratio in the range of 2.0 to 2.5, blended with a syngas formed by a dry reforming reaction and having a $H_2/CO$ ratio of no more than 1.0. A second syngas is recovered from the effluent from the Fischer-Tropsch synthesis reactor, wherein the second syngas has a higher $H_2/CO$ ratio than that of the first syngas. Before passing the second syngas to a second Fischer-Tropsch synthesis reactor, it is desirable to decrease the $H_2/CO$ ratio in the second syngas to a desired ratio appropriate for the catalyst and conditions of the second Fischer-Tropsch synthesis reactor. According to the invention, the $H_2/CO$ ratio may be decreased by adding a third gas having a lower $H_2/CO$ ratio. The process then includes forming a third syngas with a $H_2/CO$ ratio of no more than 1.0 by reacting LPG with $CO_2$; blending the second syngas with the third syngas to form a blended syngas feed having a $H_2/CO$ ratio in the range of 1.0 to 2.1, preferably in the range of 1.1 to 1.75; and feeding the blended syngas into a second Fischer-Tropsch reactor.

The present process further provides a method for preparing hydrocarbons via a Fischer-Tropsch synthesis process using a syngas feed having an unusually low $H_2/CO$ ratio. Thus, a process is provided for producing a fuel, the process comprising: reacting LPG and $CO_2$ to form a syngas with a $H_2/CO$ ratio of no more than 1.5; reacting the syngas in a Fischer-Tropsch process to produce a hydrocarbonaceous effluent; and converting the hydrocarbonaceous effluent into at least one fuel. The fuel which may be prepared in this process boils in the range of $C_{3-700}°$ F., preferably in the range of $C_{5-650}°$ F. LPG, naphtha, jet and diesel are particular fuels which may be made as described herein. In addition, the hydrocarbonaceous effluent may be further converted into at least one lubricant base stock. This lubricant base stock, optionally after additional processing using hydrotreating, hydrocracking, hydroisomerization, dewaxing, hydrofinishing, or a combination of these additional processes, preferably has a viscosity, measured at 100° C., of greater than 3 cSt, a viscosity index of greater than 120, and a pour point of less than about −9° C.

Reduction of Green House Emissions

In a separate embodiment, the present process is also directed to a method for reducing greenhouse gas emissions from a Gas to Liquids (GTL) facility by improving the proportion of resource carbon that is converted into useful product (i.e., by increasing carbon efficiency of the GTL facility). The proportion of carbon in methane that is converted to heavier hydrocarbon products in Fischer-Tropsch GTL processes is estimated to be about 68%, with the remaining 32% of the carbon being converted to some lighter hydrocarbons and to significant amounts of $CO_2$. The estimated carbon efficiency is taken from "$CO_2$ Abatement in GTL Plant: Fischer-Tropsch Synthesis," Report #PH3/15, November 2000, published by IEA Greenhouse Gas R&D Programme, and is based on a GTL facility using cryogenic air separation, an autothermal reformer, a slurry bed Fischer-Tropsch unit and a hydrocracker for converting heavy wax into saleable products. GTL facilities using alternative technologies would exhibit similar carbon conversion efficiencies and $CO_2$ emissions. While the IEA report describes how $CO_2$ extraction methods using amine scrubbers can reduce $CO_2$ emissions, it does not describe methods to improve the carbon efficiency of the process to reduce the $CO_2$ emissions.

The processes of the present invention improve the carbon efficiency of hydrocarbon synthesis facilities, such as a GTL facilities using Fischer-Tropsch synthesis processes. Carbon efficiency can be visualized by drawing a material balance line around the entire GTL process, including reforming to convert gaseous and/or liquid hydrocarbons to a syngas, hydrocarbon synthesis to convert the syngas to a hydrocarbonaceous product, and separation of the hydrocarbonaceous product to recover $C_{5+}$ hydrocarbons. Entering this material balance line are the feedstock streams, and exiting it are the net product streams. Within the material balance line, all processes derive the energy they need from the feedstock stream. For purposes of this application, the carbon efficiency of a GTL process is defined as the mass of carbon exiting the material balance line which has been incorporated into $C_{5+}$ products, divided by the mass of carbon entering the material balance line in the original feedstock. Thus, $$\text{Carbon Efficiency} = 100 * \frac{\text{Mass of C in } C_{5+} \text{ Products}}{\text{Mass of C in Feedstocks}}$$

In practice, the flows entering and exiting the material balance line are preferably summed over a time period sufficient to generate steady state operation (typically one day).

If methane is the sole feedstock, and typical operations are performed which allow significant amounts of carbon in the feed to be converted to carbon dioxide, the carbon efficiency is approximately 68%, as outlined in the IEA report. This represents current commercial operation. If hydrocarbons (LPG in this invention) are used to convert part of the $CO_2$ from the GTL process, they must be counted as part of the denominator (Mass of C in Feedstocks) in the calculation of carbon efficiency.

By use of the invention described herein, a portion of the $CO_2$ which would conventionally have been vented through the material balance line is converted into $C_{5+}$ products. According to the present invention, a GTL process is provided for converting gaseous and/or liquid hydrocarbons to $C_{5+}$ hydrocarbons. This GTL process includes reforming to convert gaseous and/or liquid hydrocarbons to a syngas, hydrocarbon synthesis to convert the syngas to a hydrocarbonaceous product, and separation of the hydrocarbonaceous product to recover $C_{5+}$ hydrocarbons. Accordingly, by use of the processes described herein, a hydrocarbon conversion process may be conducted at a carbon efficiency of greater than 75%, preferably greater than 85%, more preferably greater than 90%, and most preferably greater than 95% by the use of the present process.

In the process, carbon efficiency is improved by deriving energy from a low value carbon source, and by converting at least a portion of the $CO_2$ that would otherwise be vented from the Fisher-Tropsch unit into $C_{5+}$ hydrocarbons. Additional carbon efficiency may be obtained by using non-carbon sources of energy, such as hydrogen, as a fuel. The hydrogen may be extracted from syngas or obtained by reforming light naphtha products from the Fischer-Tropsch unit to form aromatics and hydrogen.

Specific further embodiments of the present invention include the use of supplemental $CO_2$ in the LPG conversion reactor where the supplemental $CO_2$ can be derived from the natural gas asset.

Various modifications and alterations of this invention will become apparent to those skilled in the art without departing from the scope and spirit of this invention.

What is claimed is:

1. A process for the production of a blended syngas feed with a desired $H_2/CO$ ratio comprising the steps of:
   (a) selecting a desired $H_2/CO$ ratio of a blended syngas feed;
   (b) forming a first syngas with a $H_2/CO$ ratio of at least 2.0 by reacting methane with an oxygen source, wherein the $H_2/CO$ ratio of the first syngas is greater than the desired $H_2/CO$ ratio;
   (c) forming a second syngas with a $H_2/CO$ ratio of no more than 1.5 by reacting LPG with $CO_2$, wherein the $H_2/CO$ ratio of the second syngas is less than the desired $H_2/CO$ ratio; and
   (d) blending the first syngas and the second syngas to form a blended syngas feed with the desired $H_2/CO$ ratio.

2. The process of claim 1, further comprising the step of converting the blended syngas feed in a syngas conversion reactor.

3. The process of claim 2, wherein the syngas conversion reactor is a Fischer-Tropsch reactor.

4. The process of claim 2, wherein the syngas conversion reactor is a methanol synthesis reactor.

5. The process of claim 1, wherein the desired $H_2/CO$ ratio of the blended syngas feed is in the range of 1.0 to 3.0.

6. The process of claim 5, wherein the desired $H_2/CO$ ratio of the blended syngas feed is in the range of 1.25 to 2.1.

7. The process of claim 6, wherein the desired $H_2/CO$ ratio of the blended syngas feed is in the range of 1.4 to 1.75.

8. The process of claim 1, wherein the first syngas is formed by an autothermal reformer and has a $H_2/CO$ ratio in the range of 2.0 to 2.5.

9. The process of claim 1, wherein the second syngas is formed by a dry reforming reaction and has a $H_2/CO$ ratio of no more than 1.0.

10. The process of claim 9, wherein the second syngas has a $H_2/CO$ ratio in the range of 0.5 to 1.0.

11. The process of claim 1, wherein at least a portion of the LPG reacted to form the second syngas in step (c) is recovered from a source selected from the group consisting of a natural gas asset, a syngas conversion reactor, a Fischer-Tropsch product upgrading reactor, and combinations thereof.

12. The process of claim 1, wherein at least a portion of the $CO_2$ reacted to form the second syngas in step (c) is recovered from a source selected from the group consisting of an effluent of a Fischer-Tropsch synthesis reactor, a syngas stream from a methane conversion process, a natural gas asset, a furnace flue gas, and combinations thereof.

13. The process of claim 1, wherein the oxygen reacted to form the first syngas in step (b) is obtained from a source selected from the group consisting of air, enriched air, purified oxygen, water, $CO_2$, and combinations thereof.

14. The process of claim 13, wherein the oxygen reacted to form the first syngas in step (b) is obtained from purified oxygen, which contains at least 90% oxygen.

15. The process of claim 14, wherein the oxygen reacted to form the first syngas in step (b) is obtained from purified oxygen, which contains at least 95% oxygen.

16. The process of claim 15, wherein the oxygen reacted to form the first syngas in step (b) is obtained from purified oxygen, which contains at least 99% oxygen.

17. The process of claim 13, wherein the oxygen reacted to form the first syngas in step (b) is obtained from water.

18. A process of using LPG and $CO_2$ in preparing a syngas feed for a Fischer-Tropsch reactor, comprising the steps of:
   (a) contacting LPG and $CO_2$ at reforming reaction conditions to form a first syngas with a $H_2/CO$ ratio of no more than 1.5;
   (b) blending the first syngas with a second syngas, said second syngas having a $H_2/CO$ ratio of no less than 2.0, to form a blended syngas feed, wherein the blended syngas feed has a $H_2/CO$ ratio greater than the $H_2/CO$ ratio of the first syngas and less than the $H_2/CO$ ratio of the second syngas; and
   (c) feeding the blended syngas feed into a Fischer-Tropsch reactor.

19. The process of claim 18, wherein the second syngas is generated from a methane conversion process.

20. The process of claim 18, wherein the $CO_2$ contacted with LPG to form the first syngas in step (a) is recovered from a source selected from the group consisting of an effluent from a Fischer-Tropsch reactor, a syngas stream from a methane conversion process, a natural gas asset, a furnace flue gas, and combinations thereof.

21. The process of claim 20 wherein the $CO_2$ contacted with LPG to form the first syngas in step (a) is recovered from the effluent from a Fischer-Tropsch reactor.

22. The process of claim 18, wherein the LPG contacted with $CO_2$ to form the first syngas in step (a) is recovered from a source selected from the group consisting of a natural gas asset, an effluent from a Fischer-Tropsch reactor, a Fischer-Tropsch product upgrading reactor, and combinations thereof.

23. The process of claim 22, wherein the LPG contacted with $CO_2$ to form the first syngas in step (a) is recovered from an effluent from a Fischer-Tropsch reactor or a natural gas asset.

24. The process of claim 18, wherein the blended syngas feed has a $H_2/CO$ ratio in the range of 1.4 to 1.75.

25. An integrated process for producing a blended syngas feed with a desired $H_2/CO$ ratio for a Fischer-Tropsch reactor comprising the steps of:
   (a) selecting a desired $H_2/CO$ ratio of a blended syngas feed to a Fischer-Tropsch reactor;
   (b) reacting methane, oxygen, and steam to form a first syngas with a $H_2/CO$ ratio of at least 2.0, wherein the $H_2/CO$ ratio of the first syngas is greater than the desired $H_2/CO$ ratio;
   (c) reacting LPG and $CO_2$ to form a second syngas with a $H_2/CO$ ratio of no more than 1.5, wherein the $H_2/CO$ ratio of the second syngas is less than the desired $H_2/CO$ ratio;

(d) blending the first syngas and the second syngas to form a blended syngas feed having the desired $H_2/CO$ ratio;

(e) feeding the blended syngas feed into the Fischer-Tropsch reactor;

(f) performing a Fischer-Tropsch synthesis process using the blended syngas feed;

(g) recovering a third syngas comprising unreacted $CO_2$, $H_2$, CO, and $CH_4$ from the Fischer-Tropsch reactor;

(h) recovering LPG from the Fischer-Tropsch reactor; and (i) recycling at least a portion of the third syngas to provide a feed to form the first syngas in step (b), to form the second syngas in step (c), to form the blended syngas feed in step (d), or combinations thereof.

26. The process of claim 25, wherein the LPG recovered from the Fischer-Tropsch reactor and the third syngas are used in forming the second syngas in step (c).

27. The process of claim 25, wherein at least a portion of the third syngas is reacted with the methane, oxygen, and steam of step (b) to form the first syngas with a $H_2/CO$ ratio of no less than 2.0.

28. The process of claim 25, wherein at least a portion of the third syngas is blended with the first syngas and the second syngas to form the blended syngas feed in step (d).

29. The process of claim 25, wherein the desired $H_2/CO$ ratio of the blended syngas feed is in the range of 1.0 to 3.0.

30. The process of claim 25, wherein the desired $H_2/CO$ ratio of the blended syngas feed is in the range of 1.4 to 1.75, the first syngas has a $H_2/CO$ ratio of 2.0 to 2.5, and the second syngas has a $H_2/CO$ ratio of between 0.5 and 1.0.

31. The process of claim 25, wherein the Fischer-Tropsch reactor contains a non-shifting Fischer-Tropsch catalyst.

32. The process of claim 31, wherein the non-shifting catalyst is a cobalt catalyst.

33. A process for the production of a blended syngas feed with a desired $H_2/CO$ ratio using a multiplicity of Fischer-Tropsch reactors in series comprising the steps of:

(a) feeding a first syngas comprising $H_2$ and CO and having a $H_2/CO$ ratio in the range of 1.4 to 1.75 into a first Fischer-Tropsch synthesis reactor containing a cobalt containing catalyst and recovering at least one effluent therefrom;

(b) recovering a second syngas comprising $H_2$ and CO from the effluent, wherein the second syngas has a lower $H_2/CO$ ratio than that of the first syngas;

(c) forming a third syngas with a $H_2/CO$ ratio of at least 2.0 by reacting methane with an oxygen source;

(d) blending the second syngas with the third syngas to form a blended syngas feed having a desired $H_2/CO$ ratio in the range of 1.4 to 1.75 wherein the desired $H_2/CO$ ratio of the blended syngas feed is greater than the $H_2/CO$ ratio of the second syngas and less than the $H_2/CO$ ratio of the third syngas; and (e) feeding the blended syngas feed into a second Fischer-Tropsch reactor.

34. The process of claim 33, wherein the third syngas is formed by an autothermal reformer and has a $H_2/CO$ ratio in the range of 2.0 to 2.5.

35. A process for the production of a blended syngas feed with a desired $H_2/CO$ ratio using a multiplicity of Fischer-Tropsch reactors in series comprising the steps of:

(a) feeding a first syngas, comprising $H_2$ and CO and having a $H_2/CO$ ratio in the range of 1.25 to 2.1, into a first Fischer-Tropsch synthesis reactor containing an iron containing catalyst and recovering at least one effluent therefrom;

(b) recovering a second syngas from the effluent, wherein the second syngas has a higher $H_2/CO$ ratio than that of the first syngas;

(c) forming a third syngas with a $H_2/CO$ ratio of no more than 1.5 by reacting LPG with $CO_2$;

(d) blending the second syngas with the third syngas to form a blended syngas feed having a desired $H_2/CO$ ratio in the range of 1.4 to 1.75 wherein the desired $H_2/CO$ ratio of the blended syngas feed is less than the $H_2/CO$ ratio of the second syngas and greater than the $H_2/CO$ ratio of the third syngas; and (e) feeding the blended syngas feed into a second Fischer-Tropsch reactor.

36. The process of claim 35, wherein the third syngas is formed by a dry reforming reaction and has a $H_2/CO$ ratio of no more than 1.0.

37. The process of claim 35, wherein the $H_2/CO$ ratio of the first syngas is in the range of 1.4 to 1.75.

38. A process for producing fuel comprising:

(a) reacting LPG and $CO_2$ to form a first syngas with a $H_2/CO$ ratio of no more than 1.5;

(b) blending the first syngas with a second syngas, having a $H_2/CO$ ratio of at least 2.0, to form a blended syngas, wherein the blended syngas has a $H_2/CO$ ratio greater than the $H_2/CO$ ratio of the first syngas and less than the $H_2/CO$ ratio of the second syngas;

(c) reacting the blended syngas in a Fischer-Tropsch process to produce a hydrocarbonaceous effluent; and (d) converting at least a portion of the hydrocarbonaceous effluent into at least one fuel.

39. The process of claim 38, further comprising converting a portion of the hydrocarbonaceous effluent into at least one lubricant base stock.

40. The process of claim 38, wherein the second syngas is formed in a reaction between $CH_4$ and an oxygen source.

41. The integrated process of claim 25, wherein the integrated process has a carbon efficiency of greater than 75%.

* * * * *